(12) United States Patent
Ishiguro et al.

(10) Patent No.: US 6,623,403 B2
(45) Date of Patent: Sep. 23, 2003

(54) SHIFT CONTROL METHOD FOR AN AUTOMATIC TRANSMISSION

(75) Inventors: Toshiaki Ishiguro, Chita (JP); Toshinori Murahashi, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/984,212

(22) Filed: Oct. 29, 2001

(65) Prior Publication Data

US 2002/0058568 A1 May 16, 2002

(30) Foreign Application Priority Data

Oct. 27, 2000 (JP) .......................................... 2000-329153

(51) Int. Cl.[7] ............................................. F16H 61/02
(52) U.S. Cl. ........................ 477/120; 477/901; 477/905; 477/97
(58) Field of Search ................................ 477/118, 120, 477/901, 905, 97; 701/56

(56) References Cited

U.S. PATENT DOCUMENTS

| 4,996,893 | A | * | 3/1991 | Nakamura et al. | .......... 477/120 |
| 5,044,230 | A | * | 9/1991 | Shinya et al. | ................ 477/119 |
| 5,803,865 | A | * | 9/1998 | Harada et al. | ............... 477/119 |
| 5,941,793 | A | * | 8/1999 | Ito et al. | ....................... 477/120 |
| 5,961,420 | A | * | 10/1999 | Darnell | ......................... 477/120 |

FOREIGN PATENT DOCUMENTS

JP    7(1995)-127720 A    5/1995

* cited by examiner

Primary Examiner—Charles A Marmor
Assistant Examiner—Dennis Abdelnour
(74) Attorney, Agent, or Firm—Burns, Doane, Swecker & Mathis, LLP

(57) ABSTRACT

A shift control method for an automatic transmission based on one of a first shift pattern based on vehicle speed and an opening degree of a throttle valve and a second shift pattern based on the vehicle speed and a road condition includes the steps of switching a vehicle shifting condition to the second shift pattern when the opening degree of the throttle valve is a first predetermined opening degree or smaller than the first predetermined opening degree, and switching the vehicle shifting condition to the first shift pattern when the opening degree of the throttle valve is a second predetermined opening degree or larger than the second predetermined opening degree which is larger than the first predetermined opening degree.

5 Claims, 3 Drawing Sheets

SHIFT CONTROL METHOD FOR AN AUTOMATIC TRANSMISSION

This application is based on and claims priority under 35 U.S.C. § 119 with respect to Japanese Application No. 2000-329153 filed on Oct. 27, 2000 the entire content of which is incorporated herein by reference.

FIELD OF THE INVENTION

The present invention generally relates to a shift control method for an automatic transmission in a vehicle. More specifically, the present invention pertains to a shift control method for an automatic transmission in which the shift pattern is changeable from a first shift pattern for selecting gears in response to a vehicle speed and a throttle valve opening degree to a second shift pattern for selecting gears in response to a deceleration of the vehicle or vice versa based on a vehicle running condition.

BACKGROUND OF THE INVENTION

A known control method for an automatic transmission is disclosed in a Japanese Patent Application Publication published on May 16, 1995 as Toku-Kai-Hei 7 (1995)-127720. This publication discloses a shift control method for an automatic transmission for switching from a first shift pattern to a second shift pattern depending on the throttle opening degree, the shift range set by a shift lever, the gear stage, and the vehicle speed. The first shift pattern is normally used for controlling an automatic transmission to shift between gear stages based on the vehicle speed and the throttle valve opening degree. On the other hand, the second shift pattern is used to control the automatic transmission to shift between gear stages based on the gradient of road and the vehicle speed.

Generally speaking, the throttle valve opening degree is decreased when the driver releases the acceleration pedal while a vehicle is running. Then, the vehicle shifting condition is switched from the first shift pattern to the second shift pattern to be shifted to a lower speed gear stage. In the second shift pattern, when the road condition is descending, a shift line for setting to shift the gear stage is set at a higher speed side than when the road condition is flat so that engine braking (deceleration by resistance of the internal combustion engine) can be efficiently carried out. Accordingly, the engine braking tends to be performed excessively. The driver may depress the acceleration pedal to keep the vehicle speed or to accelerate immediately after the vehicle speed becomes smaller than an expected speed by the driver. Therefore, the vehicle shifting condition is switched from the second shift pattern to the first shift pattern. The driver will release the acceleration pedal again to close the throttle valve when the vehicle speed is increased excessively. Then the vehicle shifting condition is switched from the first shift pattern to the second shift pattern. In this way, under some road conditions, the driver repeatedly depresses and releases the acceleration pedal under the vehicle condition wherein the shift pattern is switched from the first shift pattern to the second shift pattern or vice versa. The repeated increasing and decreasing of the throttle valve opening degree causes a frequent switching between the first shift pattern and the second shift pattern, which may lead to hunting of the shifting gear stages.

SUMMARY OF THE INVENTION

In accordance with an aspect of this invention, a shift control method for an automatic transmission is adapted to shift a gear stage of the automatic transmission based on one of a first shift pattern in which gear stage shifting is based on vehicle speed and an opening degree of a throttle valve and a second shift pattern based on the vehicle speed and a road condition, with shifting of the gear stage being based on the second shift pattern when the vehicle driving condition is in a deceleration condition. The control method includes switching the vehicle shifting condition from the first shift pattern to the second shift pattern when the opening degree of the throttle valve is a first predetermined opening degree or is smaller than the first predetermined opening degree. The vehicle shifting condition is switched from the second shift pattern to the first shift pattern when the opening degree of the throttle valve is a second predetermined opening degree or larger than the second predetermined opening degree, with the second predetermined opening degree being larger than the first predetermined opening degree.

The vehicle shifting condition is inhibited from switching from the second shift pattern to the first shift pattern when an increasing rate of the opening degree of the throttle valve is larger than a predetermined increasing rate, even if the opening degree of the throttle valve is the second opening degree or is larger than the second opening degree. In addition, the operation of an exhaust brake is controlled when the opening degree of the throttle valve becomes the first predetermined opening degree or smaller than the first predetermined opening degree. The method further involves stopping the operation of the exhaust brake when the opening degree of the throttle valve becomes a third predetermined opening degree or larger than the third predetermined opening degree from a controlling condition of the exhaust brake, with the third predetermined opening degree being larger than the second predetermined opening degree.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
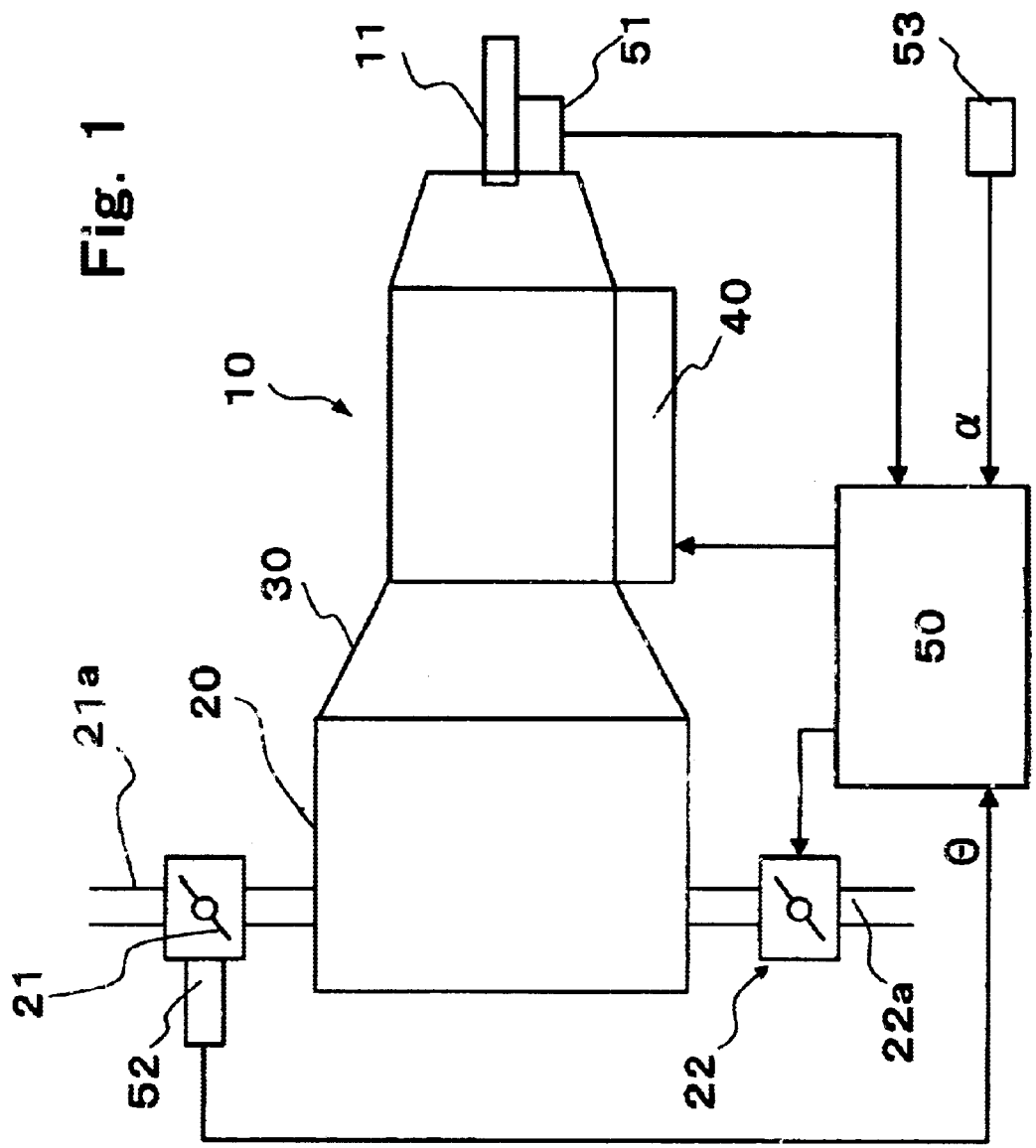
FIG. 1 is a schematic block diagram of a control system for an automatic transmission in accordance with the present invention.

FIG. 1 schematically illustrates the structure of an automatic transmission employing a control method according to the present invention and other devices associated with the automatic transmission. As shown in FIG. 1, a planetary gear-type automatic transmission 10 with five forward speeds includes a torque converter 30 transmitting a driving force of an internal combustion engine 20 to a planetary gear mechanism of the automatic transmission, and a hydraulic control device 40 for frictional engaging elements in the planetary gear-type automatic transmission 10. The control unit 50 in FIG. 1 includes a shift control unit of the automatic transmission 10 which receives input signals from sensors in the vehicle and controls the operation of the internal combustion engine 20, a shift operation of the automatic transmission 10, and an ON/OFF operation of an exhaust brake 22. The hydraulic control device 40 is provided with a plurality of solenoid valves and the control unit 50 controls the current for driving or operating the solenoid valves to provide hydraulic pressure to the frictional engaging elements based on a shift operating command. Thus the frictional engaging elements are controlled to accomplish a desirable shifting operation.

The exhaust brake 22 is provided in an exhaust pipe 22a of the internal combustion engine 20, and performs a desirable engine braking operation by cooperating with the automatic transmission 10 when the exhaust brake 22 is "ON". A throttle valve 21 shown in FIG. 1 operated by an acceleration pedal is provided in an air intake pipe 21a of the internal combustion engine 20.

The control unit 50 receives the input signal from sensors provided in the vehicle. The sensors includes an output shaft rotation sensor 51 which detects the revolution or rotation of an output shaft 11 of the automatic transmission 10, a throttle valve sensor 52 which is provided adjacent the throttle valve 21 for detecting the opening degree of the throttle valve 21 (i.e., the throttle valve opening degree θ, and a road gradient sensor 53 which detects the inclination of the road on which the vehicle is running (i.e., the road gradient α). The throttle valve opening degree θ is proportional to the depressing amount of the acceleration pedal.

The control unit 50 sets a first shift pattern for the automatic transmission 10 to select a change gear stage based on the vehicle speed V and the throttle valve opening degree θ, and sets a second shift pattern for the automatic transmission 10 to select a change gear stage based on the gradient of the road α and the vehicle speed V when the vehicle is being decelerated.

Figure 2:
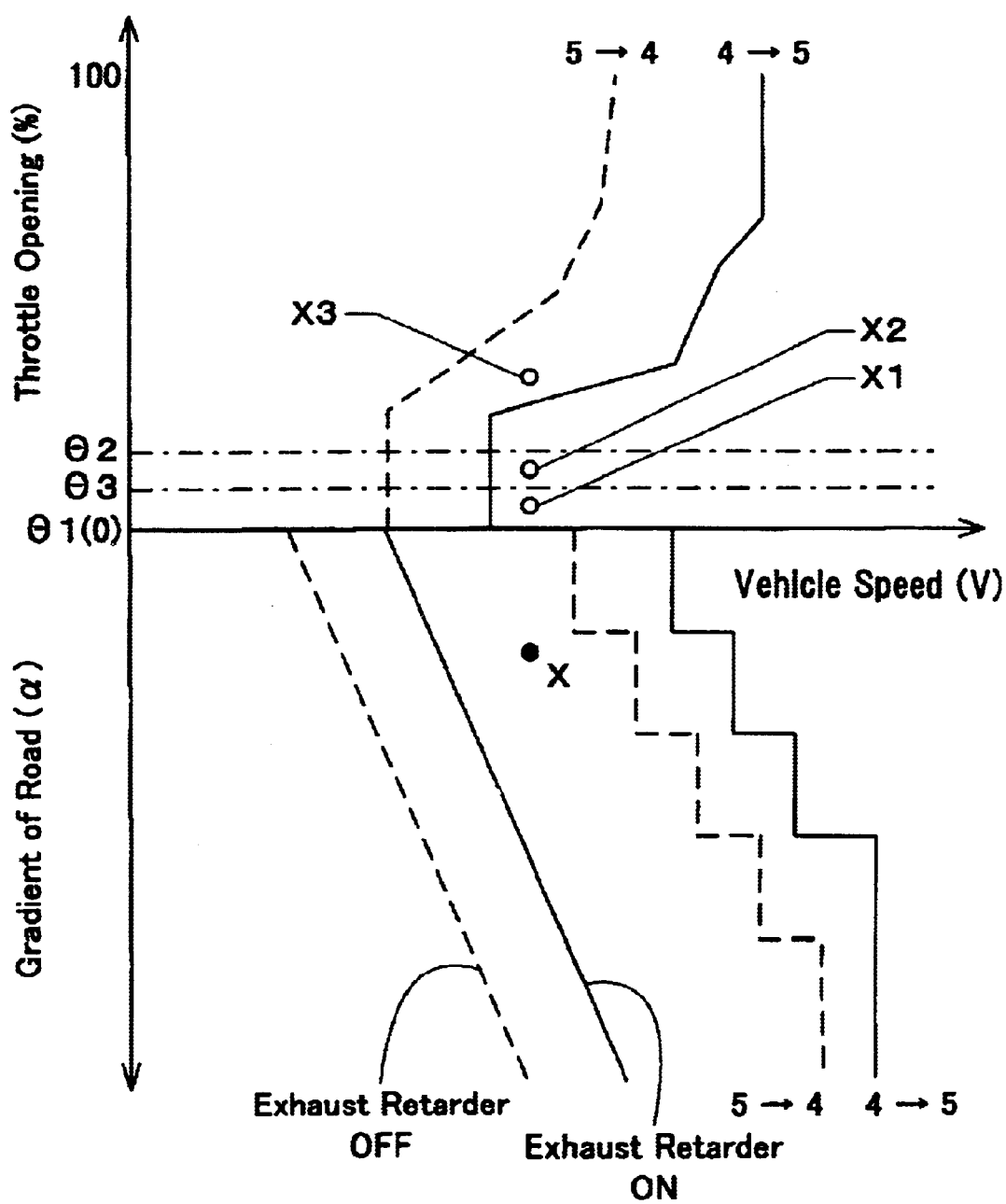
FIG. 2 is a shift diagram of the first shift pattern and second shift pattern in accordance with the present invention.

FIG. 2 shows the first shift pattern and the second shift pattern for the automatic transmission 10. The area below the horizontal line indicating the throttle valve opening degree θ1 corresponds to the vehicle condition in which the vehicle is being decelerated, and the automatic transmission 10 is shifted based on the second shift pattern in this area. That is, the throttle valve opening degree θ1 corresponds to a first predetermined opening degree. In this embodiment, the first predetermined opening degree θ1 is set to zero. For purposes of simplifying the illustration and to clearly show the shift patterns, the up-shift diagram indicating shift patterns for selecting higher speed gear stages in the first to fourth speeds is omitted from the drawing figure. Similarly, the downshift diagram indicating shift patterns for selecting lower speed gear stages in the fourth to first speeds is omitted.

The up-shift diagram indicating the shift pattern for shifting from the fourth speed to the fifth speed (solid line in FIG. 2) and the downshift diagram indicating the shift pattern for shifting from the fifth speed to the fourth speed (the dashed line in FIG. 2) are illustrated in FIG. 2. Even if the vehicle is running at other gear stage changes, for example at the third gear stage, the automatic transmission 10 can be effectively controlled in the same manner as this embodiment. The vehicle speed V is calculated from the input signal from the output shaft rotation sensor 51 disposed adjacent the automatic transmission 10.

Figure 3:
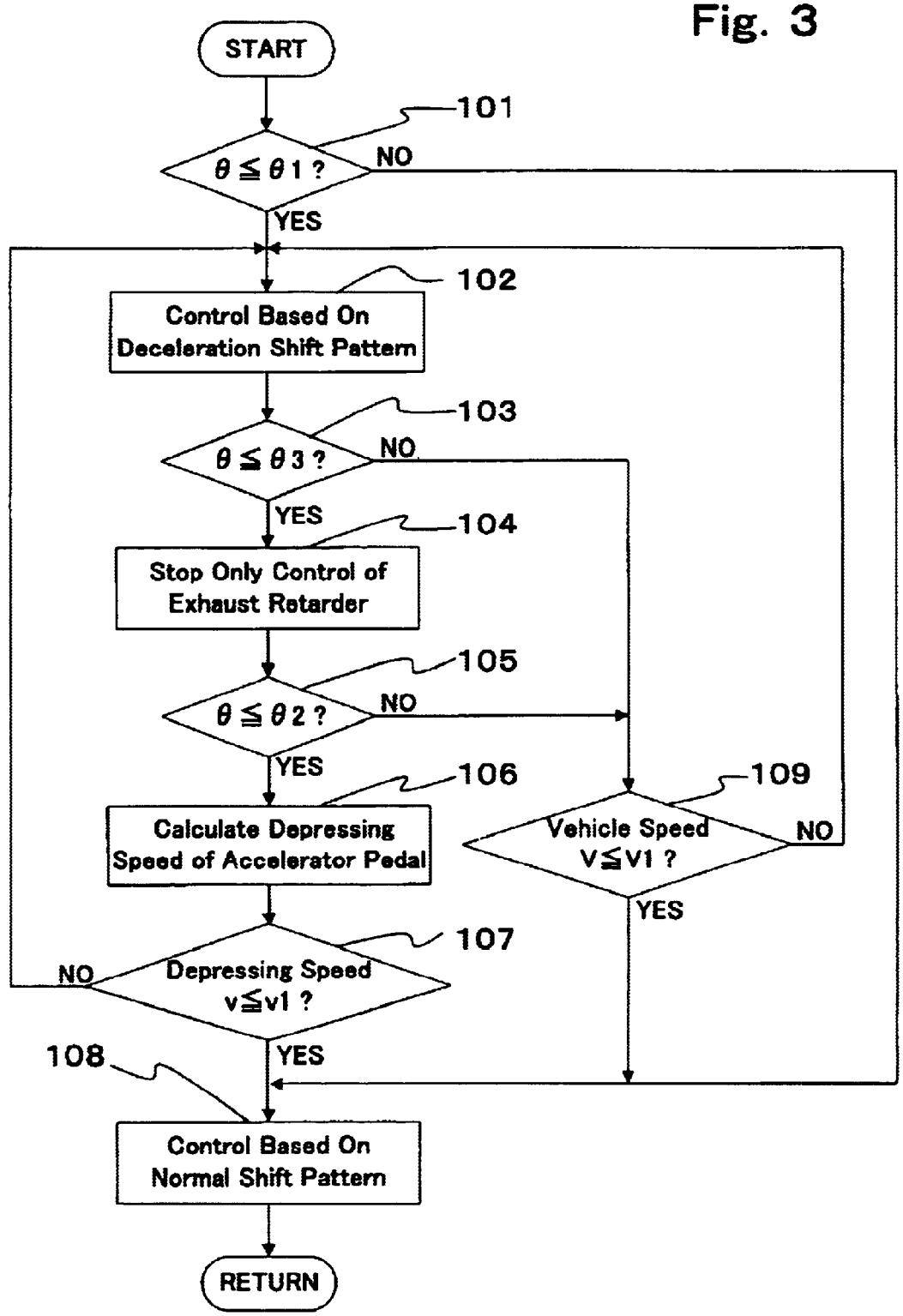
FIG. 3 is a flow chart showing the control method of the automatic transmission according to the present invention.

The shift control method for the automatic transmission 10 of the present invention performed by the control unit 50 will be described with reference to the flow chart in FIG. 3. The control is started at a predetermined cycle or predetermined interval. At step 101, the control unit 50 judges whether or not the throttle valve opening degree θ is equal to or less than a first predetermined opening degree θ1 (i.e., whether or not the vehicle is being decelerated). In this described embodiment, the first predetermined opening degree θ1 is set at zero degrees (0°). If it is determined in step 101 that the throttle valve opening degree θ is larger than the first predetermined opening degree θ1, it is judged that the vehicle is not being decelerated, and the program then proceeds to step 108. At step 108, the control unit 50 sends commands to the automatic transmission 10 to select the change gear stage based on the first shift pattern. Once the control unit 50 stops or completes the control based on the first shift pattern, then the program returns to step 101.

If it is determined in step 101 that the throttle valve opening degree θ is equal to the first predetermined opening degree θ1 (or less than the first predetermined opening degree θ1), the vehicle is judged to be under deceleration and so the program proceeds to step 102. At step 102, the control unit 50 sends commands to the automatic transmission 10 based on the second shift pattern shown in FIG. 2. At this time, the control unit 50 further controls the ON/OFF operation of the exhaust brake 22 based on the shift diagrams in FIG. 2.

The program then proceeds from step 102 to step 103 where the control unit 50 judges whether or not the throttle valve opening degree θ is larger than (equal to or greater than) a third predetermined opening degree θ3. If the throttle valve opening degree θ is equal to or greater than the third predetermined opening degree θ3, the program proceeds to step 104. Here, the control unit 50 stops control of the ON/OFF operation of the exhaust brake 22. The program then proceeds to step 105 and the control unit 50 judges whether or not the throttle valve opening degree θ is larger than (equal to or greater than) a second predetermined opening degree θ2. If the throttle valve opening degree θ is greater than or equal to the second predetermined opening degree θ2, the program proceeds to step 106 where the control unit 50 calculates the depressing speed v, which is the moving speed of the acceleration pedal depressed by the driver. The depressing speed v can be found from the change Δθ of the throttle valve opening degree θ at steps 101–105 and the time T for processing from step 101 to step 105. The program then proceeds to step 107 and the control unit 50 judges whether or not the depressing speed v is larger than a predetermined depressing speed v1. If the depressing speed v is smaller than (less than or equal to) the predetermined depressing speed v1, it is estimated or determined that the driver is gradually accelerating the vehicle. The program then proceeds to step 108. At step 108, the second shift pattern is switched over to the first shift pattern so that the control unit 50 outputs the commands for the automatic transmission 10 to select the change gear stage control based on the first shift pattern.

If it is determined at step 107 that the depressing speed v is larger than the predetermined depressing speed v1, it is estimated or determined that the driver is accelerating the vehicle quickly because the control based on the second shift pattern makes the vehicle decelerate more rapidly than the driver wants. Thus the second shift pattern is not to be switched over to the first shift pattern when the depressing speed v is larger than the predetermined depressing speed v1. Therefore, the control unit 50 keeps sending the commands based on the second shift pattern.

If it is determined in step 103 that the throttle valve opening degree θ is smaller than the third predetermined opening degree θ3 and if it is determined in step 105 that the throttle valve opening degree θ is smaller than the second predetermined opening degree θ2, the program proceeds to step 109. At step 109, the control unit 50 judges whether or not the vehicle speed V is smaller than the predetermined vehicle speed V1. The predetermined vehicle speed V1 is the estimated speed that it is not necessary to shift based on the second shift pattern. By way of example, the predetermined vehicle speed V1 of this embodiment is set at 15 km/h.

The above-described method of controlling the automatic transmission 10 following the process shown in the flow chart of FIG. 3 will be further described with reference to FIG. 2. A point X corresponds to a vehicle condition wherein the automatic transmission 10 is controlled to be in the fourth speed based on the second shift pattern. If an increase in the throttle valve opening degree θ causes the vehicle condition corresponding to the point X to be changed or moved to another vehicle condition corresponding to the point X1 in FIG. 2, the automatic transmission 10 is continuously controlled to be in the fourth speed or is not to be shifted to the fifth speed because the control unit 50 controls the transmission 10 based on the second shift pattern, but the exhaust brake 22 is not controlled to be ON or OFF. If the increase of the throttle valve opening degree θ causes the vehicle condition corresponding to point X to be changed or moved to another vehicle condition corresponding to point X2 in FIG. 2, the automatic transmission 10 is continuously controlled to be in the fourth speed because the control unit 50 is controlled based on the deceleration pattern, but the exhaust brake 22 is not controlled to be ON or OFF. Moreover, if the increase of the throttle valve opening degree θ causes the vehicle condition corresponding to the point X to be changed to another vehicle condition corresponding to the point X3 in FIG. 2, it is judged that the automatic transmission 10 is to be controlled to shift to the fourth speed after once shifting to the fifth speed based on the second shift pattern and depending on the depressing speed v, or to be continuously controlled to be in the fourth speed based on the first shift pattern. Even if the vehicle condition corresponds to the point X in FIG. 2, or the throttle opening degree θ is the first predetermined opening degree θ1, the second shift pattern is switched to the first shift pattern when the vehicle speed V is smaller than the predetermined vehicle speed V1.

According to this embodiment, if the throttle valve opening degree θ is operated or increased not to be in excess of the second predetermined opening degree θ2 immediately after the vehicle condition is changed from the first shift pattern to the second shift pattern, the automatic transmission 10 is controlled based not on the first shift pattern but on the second shift pattern. The above shift control method for the automatic transmission 10 prevents switching of the shift pattern from repeatedly occurring. This advantageously reduces hunting of the shifting gear stages, and therefore improves the shift feeling of the automatic transmission 10.

The embodiment of the present invention is described above in connection with one embodiment, but it is to be understood that the present invention is not limited in this way. For example, even if the vehicle is traveling at a speed other than the fourth speed, the method of controlling the automatic transmission 10 is performed as same as the method described above. Moreover, the control unit 50 can be adapted to control not only the ON/OFF operation of the exhaust brake 22 but also the ON/OFF operation of a lock-up clutch. In this way, the vehicle can be more effectively decelerated. Further, it is possible to set the first predetermined opening degree θ1 to be larger than zero, between zero and the second predetermined opening degree.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift control method for an automatic transmission for shifting a gear stage of the automatic transmission based on one of a first shift pattern in which gear stage shifting is based on vehicle speed and an opening degree of a throttle valve and a second shift pattern in which gear stage shifting is based on the vehicle speed and a road condition, with shifting of the gear stage being based on the second shift pattern when the vehicle driving condition is in a deceleration condition, comprising:

switching a vehicle shifting condition from the first shift pattern to the second shift pattern when the opening degree of the throttle valve is a first predetermined opening degree or smaller than the first predetermined opening degree;

switching the vehicle shifting condition from the second shift pattern to the first shift pattern when the opening degree of the throttle valve is a second predetermined opening degree or larger than the second predetermined opening degree, the second predetermined opening degree being larger than the first predetermined opening degree; and inhibiting the vehicle shifting condition from switching from the second shift pattern to the first shift pattern when an increasing rate of opening degree of the throttle valve is higher than a predetermined increasing rate, even if the opening degree of the throttle valve is the second predetermined opening degree or larger than the second predetermined opening degree.

2. The shift control method for the automatic transmission in accordance with claim 1, further comprising:

controlling operation of an exhaust brake when the opening degree of the throttle valve becomes the first predetermined opening degree or smaller than the first predetermined opening degree; and stopping operation of the exhaust brake when the opening degree of the throttle valve becomes a third predetermined opening degree or larger than the third predetermined opening degree, with the third predetermined opening degree being larger than the first predetermined opening degree from a controlling condition of the exhaust brake.

3. The shift control method for the automatic transmission in accordance with claim 2, wherein the third predetermined opening degree is smaller than the second predetermined opening degree.

4. A shift control method for an automatic transmission for shifting a gear stage of the automatic transmission based on one of a first shift pattern in which gear stage shifting is based on vehicle speed and an opening degree of a throttle valve and a second shift pattern in which gear stage shifting is based on the vehicle speed and a road condition, with shifting of the gear stage being based on the second shift pattern when the vehicle driving condition is in a deceleration condition, comprising:

switching a vehicle shifting condition from the first shift pattern to the second shift pattern when the opening degree of the throttle valve is a first predetermined opening degree or smaller than the first predetermined opening degree;

switching the vehicle shifting condition from the second shift pattern to the first shift pattern when the opening degree of the throttle valve is a second predetermined opening degree or larger than the second predetermined opening degree, the second predetermined opening degree being larger than the first predetermined opening degree;

controlling operation of an exhaust brake when the opening degree of the throttle valve becomes the first predetermined opening degree or smaller than the first predetermined opening degree; and stopping operation of the exhaust brake when the opening degree of the throttle valve becomes a third predetermined opening degree or larger than the third predetermined opening degree, with the third predetermined opening degree being larger than the first predetermined opening degree from a controlling condition of the exhaust brake.

5. The shift control method for the automatic transmission in accordance with claim 4, wherein the third predetermined opening degree is smaller than the second predetermined opening degree.

* * * * *